US009446756B2

United States Patent
Chen et al.

(10) Patent No.: US 9,446,756 B2
(45) Date of Patent: *Sep. 20, 2016

(54) POWER SYSTEM OF HYBRID ELECTRIC VEHICLE, HYBRID ELECTRIC VEHICLE COMPRISING THE SAME AND METHOD FOR HEATING BATTERY GROUP OF HYBRID ELECTRIC VEHICLE

(71) Applicant: BYD COMPANY LIMITED, Shenzhen (CN)

(72) Inventors: Liqiang Chen, Shenzhen (CN); Hongjun Wang, Shenzhen (CN); Shibin Xie, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/403,403

(22) PCT Filed: May 22, 2013

(86) PCT No.: PCT/CN2013/076055
§ 371 (c)(1),
(2) Date: Nov. 24, 2014

(87) PCT Pub. No.: WO2013/174260
PCT Pub. Date: Nov. 28, 2013

(65) Prior Publication Data
US 2015/0166045 A1 Jun. 18, 2015

(30) Foreign Application Priority Data
May 22, 2012 (CN) .......................... 2012 1 0160624

(51) Int. Cl.
*H01M 10/615* (2014.01)
*B60W 20/00* (2016.01)
(Continued)

(52) U.S. Cl.
CPC ............. *B60W 20/106* (2013.01); *B60L 1/003* (2013.01); *B60L 1/02* (2013.01); *B60L 3/0023* (2013.01);
(Continued)

(58) Field of Classification Search
CPC .. B60W 20/106; B60W 10/26; B60W 10/08; Y10S 903/93; B60L 11/1875; B60L 3/0046; B60L 3/04; B60L 11/1864; H01M 10/5006; H01M 10/5016; H01M 10/615
USPC ............ 701/22; 180/65.265–65.29; 903/903, 903/941, 947
See application file for complete search history.

(56) References Cited

U.S. PATENT DOCUMENTS 5,834,132 A 11/1998 Hasegawa et al.
6,408,968 B1 * 6/2002 Wakashiro ............. B60K 6/485
                                                        180/65.26
(Continued)

FOREIGN PATENT DOCUMENTS

CN          102055042 A     5/2011
CN          202219728 U     5/2012
(Continued)

*Primary Examiner* — Dalena Tran
(74) *Attorney, Agent, or Firm* — Anova Law Group, PLLC

(57) ABSTRACT

A power system of a hybrid electric vehicle, a hybrid electric vehicle comprising the same and a method for heating a battery group of the hybrid electric vehicle are provided. The power system includes: a battery group; a battery heater connected with the battery group; a battery management device configured to control the battery heater to heat the battery group with a first power or a second power when the hybrid electric vehicle is in an electric vehicle mode or a hybrid electric vehicle mode, when the temperature of the battery group is lower than a first heating threshold and a residual electric quantity of the battery group is larger than a parking electric quantity threshold; an electric distribution box; an engine; a motor; a motor controller connected with the motor and the electric distribution box respectively; and an isolation inductor.

20 Claims, 9 Drawing Sheets

(51) Int. Cl.

| | | |
|---|---|---|
| *B60L 1/00* | (2006.01) | |
| *B60L 1/02* | (2006.01) | |
| *B60L 3/00* | (2006.01) | |
| *B60L 3/04* | (2006.01) | |
| *B60L 11/18* | (2006.01) | |
| *H01M 10/625* | (2014.01) | |
| *H01M 10/633* | (2014.01) | |
| *H01M 10/613* | (2014.01) | |
| *B60W 10/08* | (2006.01) | |
| *B60W 10/26* | (2006.01) | |

(52) U.S. Cl.
CPC ............. *B60L 3/0046* (2013.01); *B60L 3/04* (2013.01); *B60L 11/1805* (2013.01); *B60L 11/1874* (2013.01); *B60L 11/1875* (2013.01); *B60W 10/08* (2013.01); *B60W 10/26* (2013.01); *B60W 20/13* (2016.01); *H01M 10/613* (2015.04); *H01M 10/625* (2015.04); *H01M 10/633* (2015.04); *B60L 2240/545* (2013.01); *B60L 2250/16* (2013.01); *Y02T 10/7005* (2013.01); *Y02T 10/705* (2013.01); *Y10S 903/93* (2013.01)

(56) References Cited

U.S. PATENT DOCUMENTS

| | | | |
|---|---|---|---|
| 7,971,665 B2 * | 7/2011 | Tumback | B60K 6/48 180/65.21 |
| 2007/0212598 A1 | 9/2007 | Iida et al. | |
| 2011/0298427 A1 | 12/2011 | Uemura et al. | |
| 2012/0245781 A1 | 9/2012 | Kanamori | |

FOREIGN PATENT DOCUMENTS

| | | |
|---|---|---|
| JP | H08138762 A | 5/1996 |
| JP | 3509382 B2 | 3/2004 |
| JP | 4120025 B2 | 7/2008 |
| JP | 2009072003 A | 4/2009 |
| WO | 2008023245 A2 | 2/2008 |
| WO | 2011070848 A1 | 6/2011 |

* cited by examiner

POWER SYSTEM OF HYBRID ELECTRIC VEHICLE, HYBRID ELECTRIC VEHICLE COMPRISING THE SAME AND METHOD FOR HEATING BATTERY GROUP OF HYBRID ELECTRIC VEHICLE

CROSS-REFERENCES TO RELATED APPLICATIONS

This application is a national phase entry under 35 U.S.C. §371 of International Application No. PCT/CN2013/076055, filed on May 22, 2013, which claims the priority to and benefits of Chinese patent application No. 201210160624.0, filed with the State Intellectual Property Office of P. R. C., on May 22, 2012, the entire contents of all of which are incorporated herein by reference.

FIELD OF THE INVENTION

Exemplary embodiments of the present disclosure relate generally to a power system and, more particularly, to a power system of a hybrid electric vehicle, a hybrid electric vehicle comprising the power system and a method for heating a battery group of the hybrid electric vehicle.

BACKGROUND

With the development of the science and technology, new energy vehicles, especially pure electric vehicles and hybrid electric vehicles, gradually enter into ordinary families as a means of transportation. The performance requirement, especially the comfort requirement of a user for the vehicle, is higher and higher, which requires that the vehicle must adapt to different operating requirements. But currently most pure electric vehicles and hybrid electric vehicles cannot satisfy such requirements. Especially in winter, the temperature is low so that the capability of a battery, no matter the discharge capability or the battery capacity, may be decreased or the battery cannot even be used. Specifically, the work temperature of the battery especially lithium ion battery is generally within a range from −20° C. to 55° C., and the battery is not allowed to be charged at a low temperature. Under a low temperature condition, the battery in the electric vehicle may have the following problems. (1) The lithium ions may be deposited easily at the negative electrode and lose the electrical activity at the low temperature, and therefore, if the battery in the electric vehicle is usually used at the low temperature, the life of the battery may be shortened and a safety problem may be caused accordingly. (2) When the lithium ion battery is charged at the low temperature, the lithium ions may be deposited easily at the negative electrode to become dead ions and thus the capacity of the battery may be decreased. Moreover, the deposited ions grow larger and larger during the continuous use, thus leading to a potential danger such as an internal short circuit. (3) The discharge capability of the battery is limited at the low temperature. All of the problems listed above may be not favorable for the electric vehicle which uses green and environment friendly new energy.

The method for heating a battery is an important technology in the electric vehicle field. A heating strategy of the battery and the performance of the battery heater influence the comfort, operation stability and safety of the vehicle directly. Many new technologies are applied in the battery heating, but because of the self-capability defects, the technologies are not widely applied in the vehicle field. For example, a thermal insulation sleeve is provided to warm a battery by thermal insulation material; an infrared radiation film is used to heat the battery and a thermal insulation sleeve is provided to keep warm; or a heating patch is attached on the surface of the battery. These methods are only suitable for the fixed battery. Furthermore, using the external power to heat the battery is not suitable for the vehicle which is not fixed in position. Therefore, the above methods have not been widely applied in the pure electric vehicle field and hybrid electric vehicle field.

BRIEF SUMMARY OF THE DISCLOSURE

According to a first aspect of the present disclosure, a power system of a hybrid electric vehicle is provided. The power system comprises: a battery group; a battery heater, connected with the battery group and configured to charge and discharge the battery group to heat the battery group; a battery management device, connected with the battery group and the battery heater respectively, and configured to: if a temperature of the battery group is lower than a first heating threshold and a residual electric quantity of the battery group is larger than a running electric quantity threshold, control the battery heater to heat the battery group with a first power when the hybrid electric vehicle is in an electric vehicle mode, and heat the battery group with a second power when the hybrid electric vehicle is in a hybrid electric vehicle mode, wherein the second power is larger than the first power; an electric distribution box, configured to distribute a voltage output by the battery group; an engine; a motor; a motor controller, connected with the motor and the electric distribution box respectively, comprising a first input terminal, a second input terminal and a pre-charging capacitor connected between the first input terminal and the second input terminal, and configured to supply power to the motor according to a control command and a voltage distributed by the electric distribution box; and an isolation inductor, connected between the battery group and the electric distribution box, in which an inductance of the isolation inductor matches with a capacitance of the pre-charging capacitor.

With the power system of the hybrid electric vehicle according to embodiments of the present disclosure, by using a large current discharge of the battery group in the hybrid electric vehicle, the internal resistor of the battery itself may be heated so that the battery group may be heated. Without any external power supply, the electricity for heating is totally supplied by the battery group. A heating management may be performed for the battery group by the battery management device and the battery heater, which may greatly reduce the restriction on the use of the hybrid electric vehicle at the low temperature, thus satisfying the requirements of running and charging at the low temperature. Moreover, the power system heats the battery group directly, and therefore, higher heating efficiency, lower cost and better utility may be obtained.

According to a second aspect of the present disclosure, a hybrid electric vehicle comprising the above power system is provided. The hybrid electric vehicle can normally run in a cold region and the battery group can be heated while the hybrid electric vehicle is running, thus ensuring a safe and smooth running.

According to a third aspect of the present disclosure, a method for heating a battery group of a hybrid electric vehicle is provided. The method comprises: detecting a temperature and a residual electric quantity of the battery group; if the temperature of the battery group is lower than a first heating threshold and the residual electric quantity of the battery group is larger than a running electric quantity threshold, judging a mode the hybrid electric vehicle is in; controlling the battery heater to heat the battery group with a first power if the hybrid electric vehicle is in an electric vehicle mode; controlling the battery heater to heat the battery group with a second power if the hybrid electric vehicle is in a hybrid electric vehicle mode, wherein the second power is higher than the first power; and indicating the battery group is inhibited from being heated or charged and the hybrid electric vehicle is inhibited from being driven if the temperature of the battery group is lower than the first heating threshold and the residual electric quantity of the battery group is lower than the parking electric quantity threshold.

With the method for heating the battery group of the hybrid electric vehicle according to embodiments of the present disclosure, the battery group may be heated directly without any external power supply. The temperature of the battery group may be increased to a required temperature and then the battery group may be charged or discharged normally, which may greatly reduce the restriction on the use of the hybrid electric vehicle at the low temperature, thus satisfying the requirements of running and charging at the low temperature.

BRIEF DESCRIPTION OF THE DRAWINGS

Having thus described exemplary embodiments of the present disclosure in general terms, reference will now be made to the accompanying drawings, which are not necessarily drawn to scale.

Figure 1:
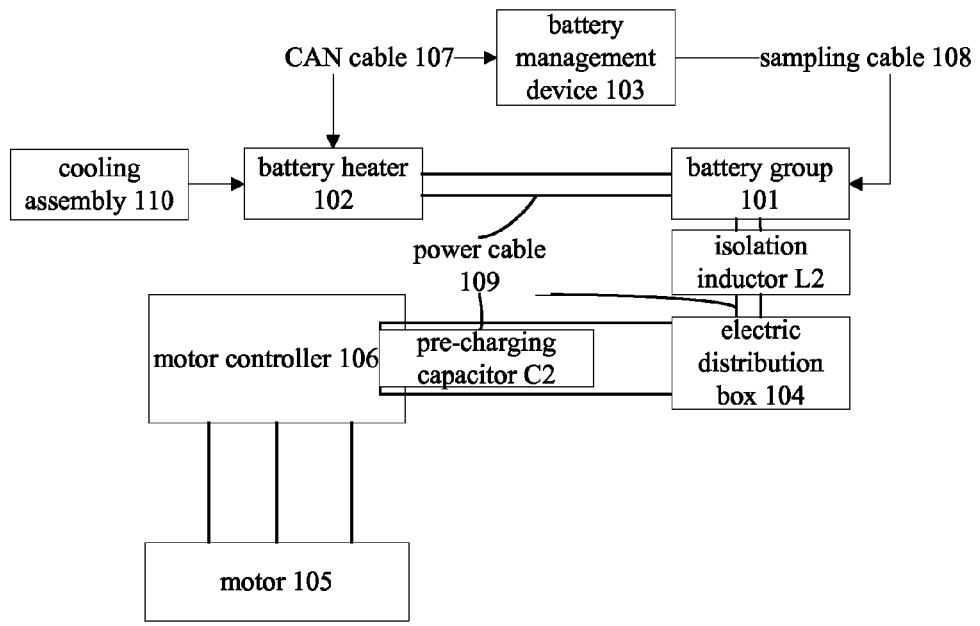
Figure 2:
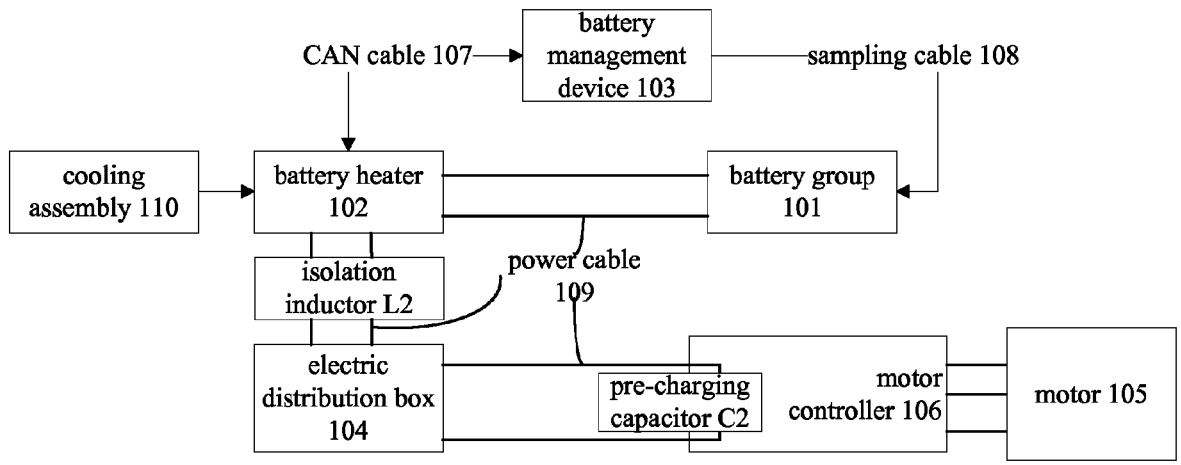
Figure 3:
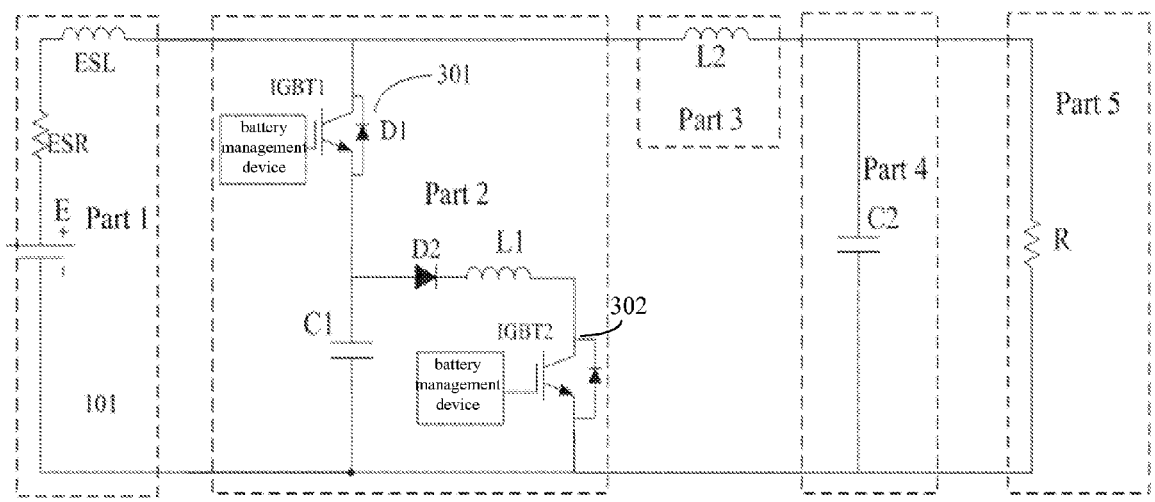
Figure 4:
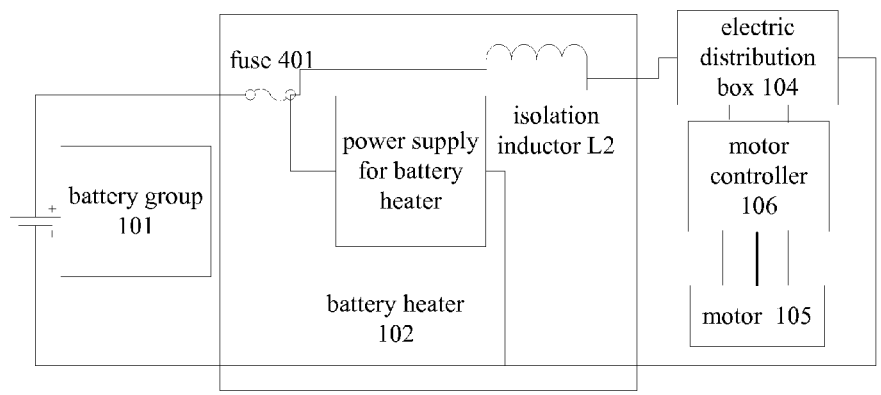
Figure 5:
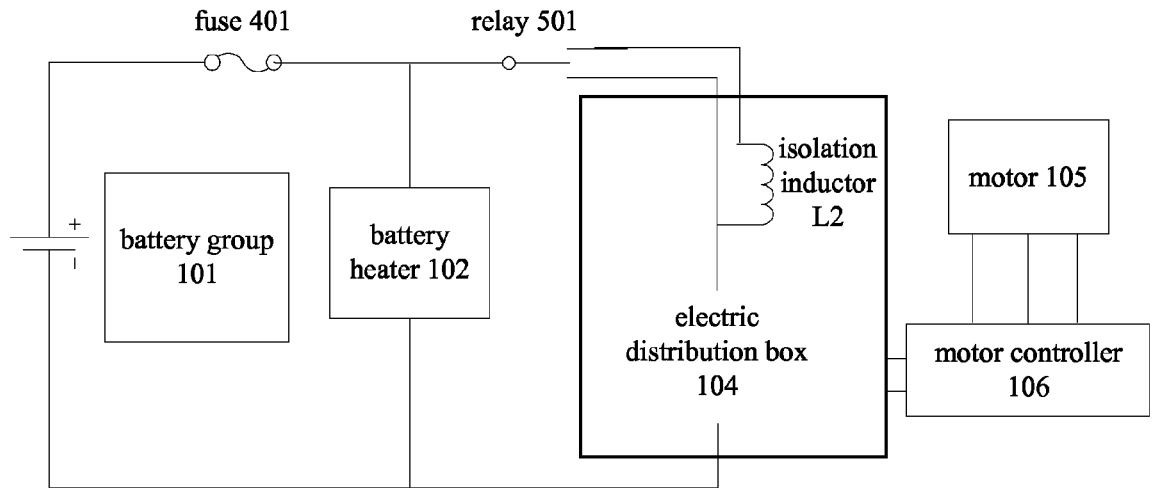
Figure 6:
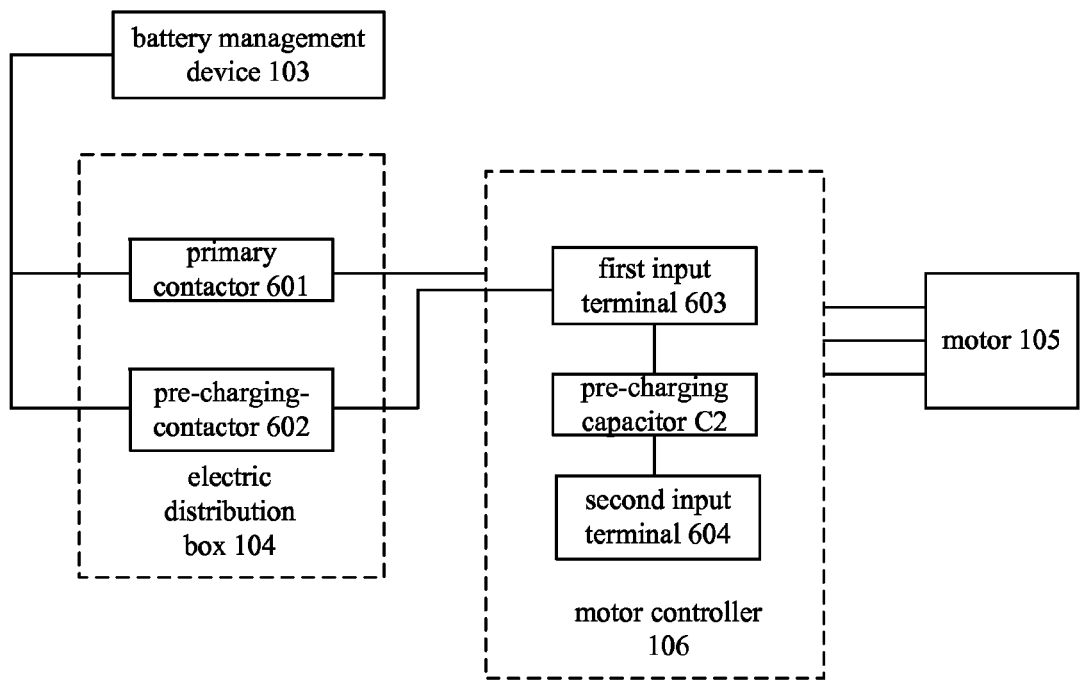
Figure 7:
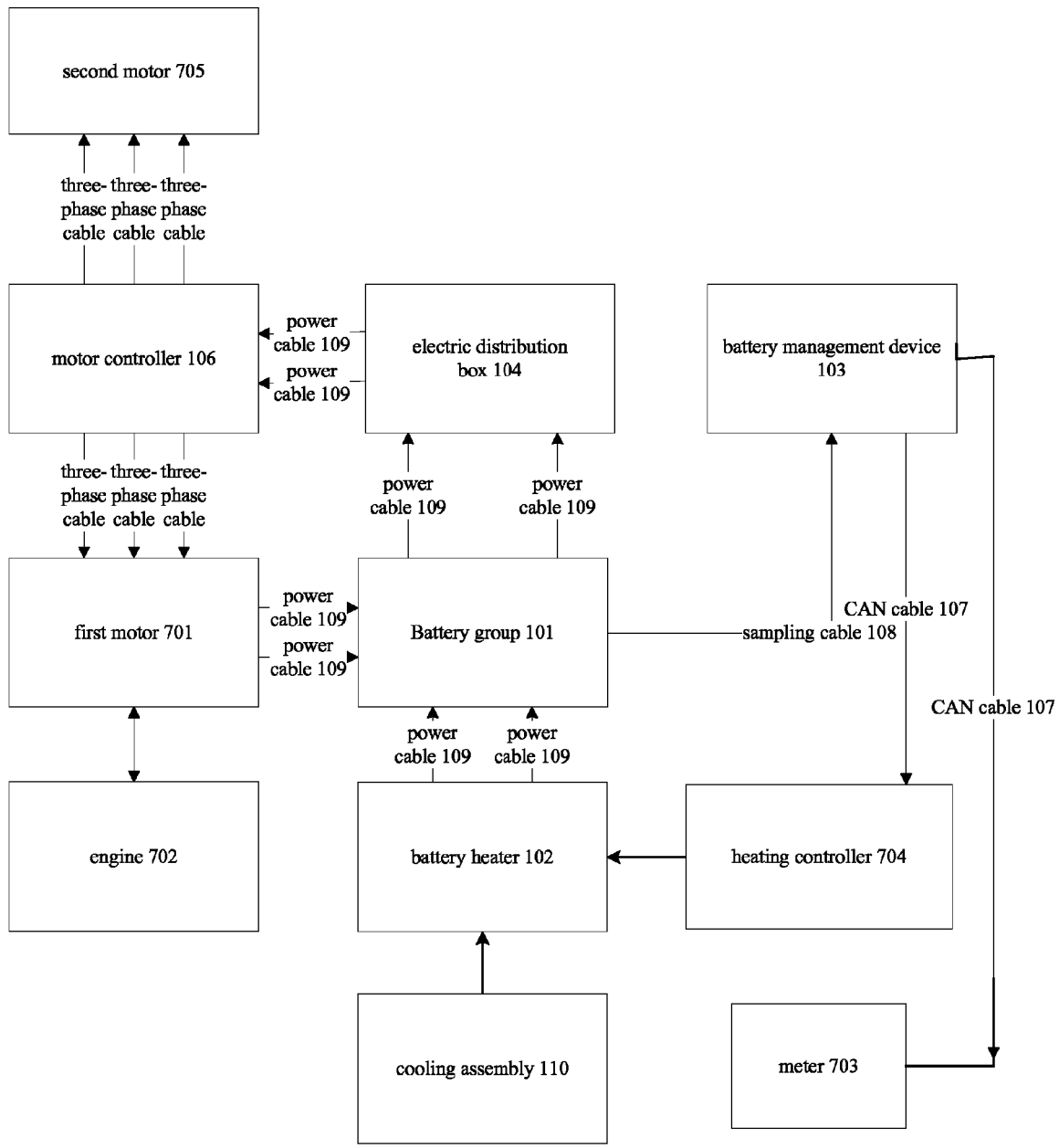
Figure 8:
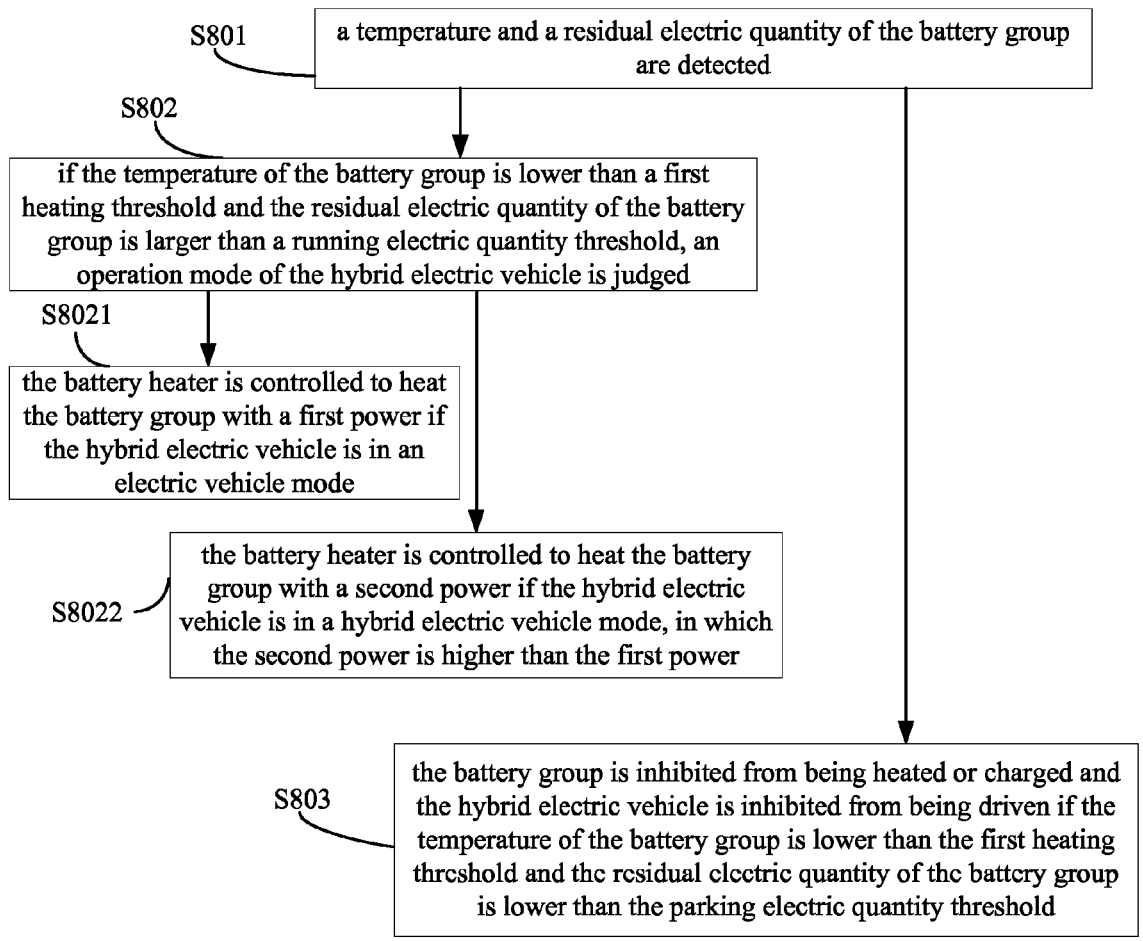
Figure 9A:
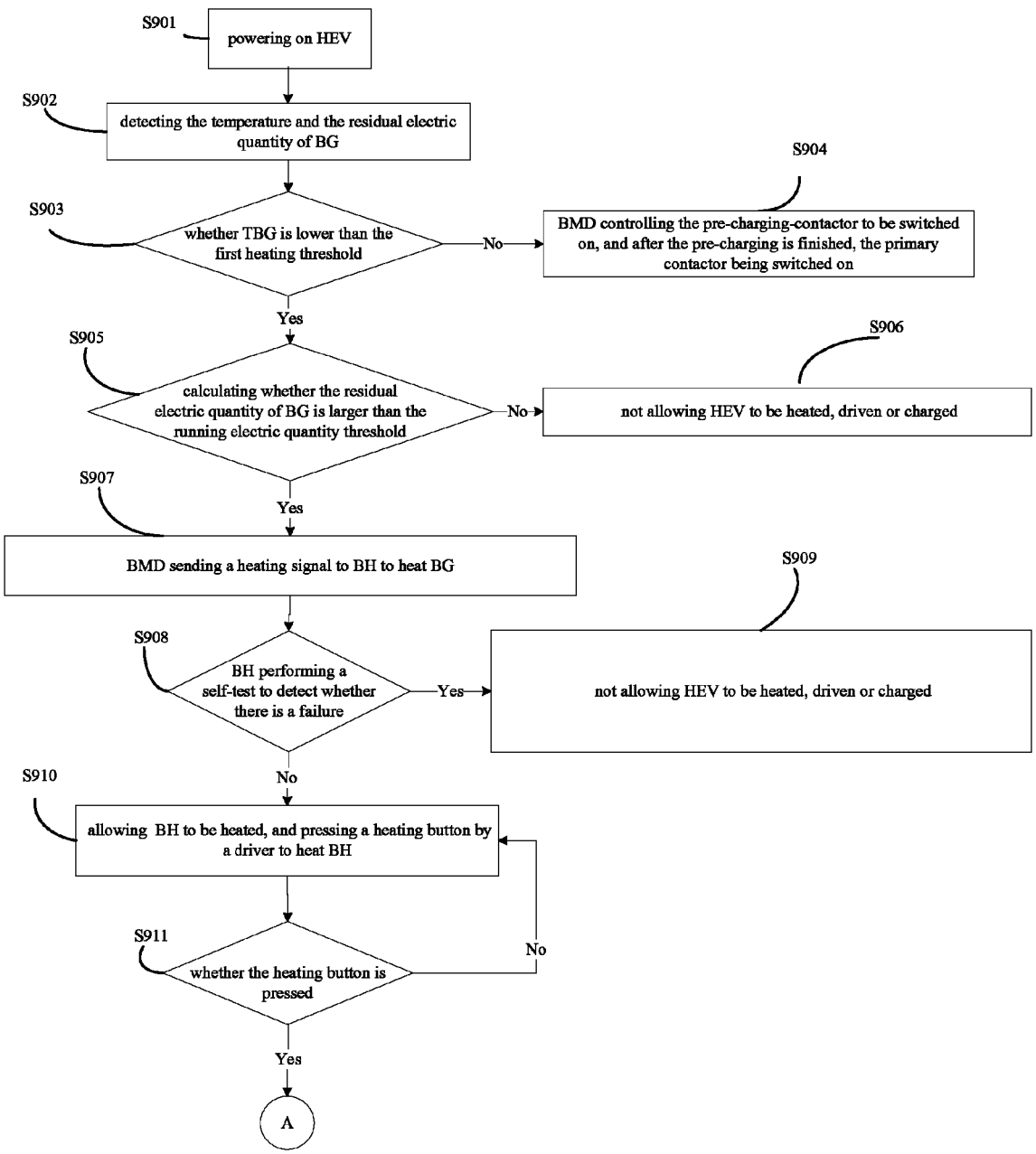
Figure 9B:
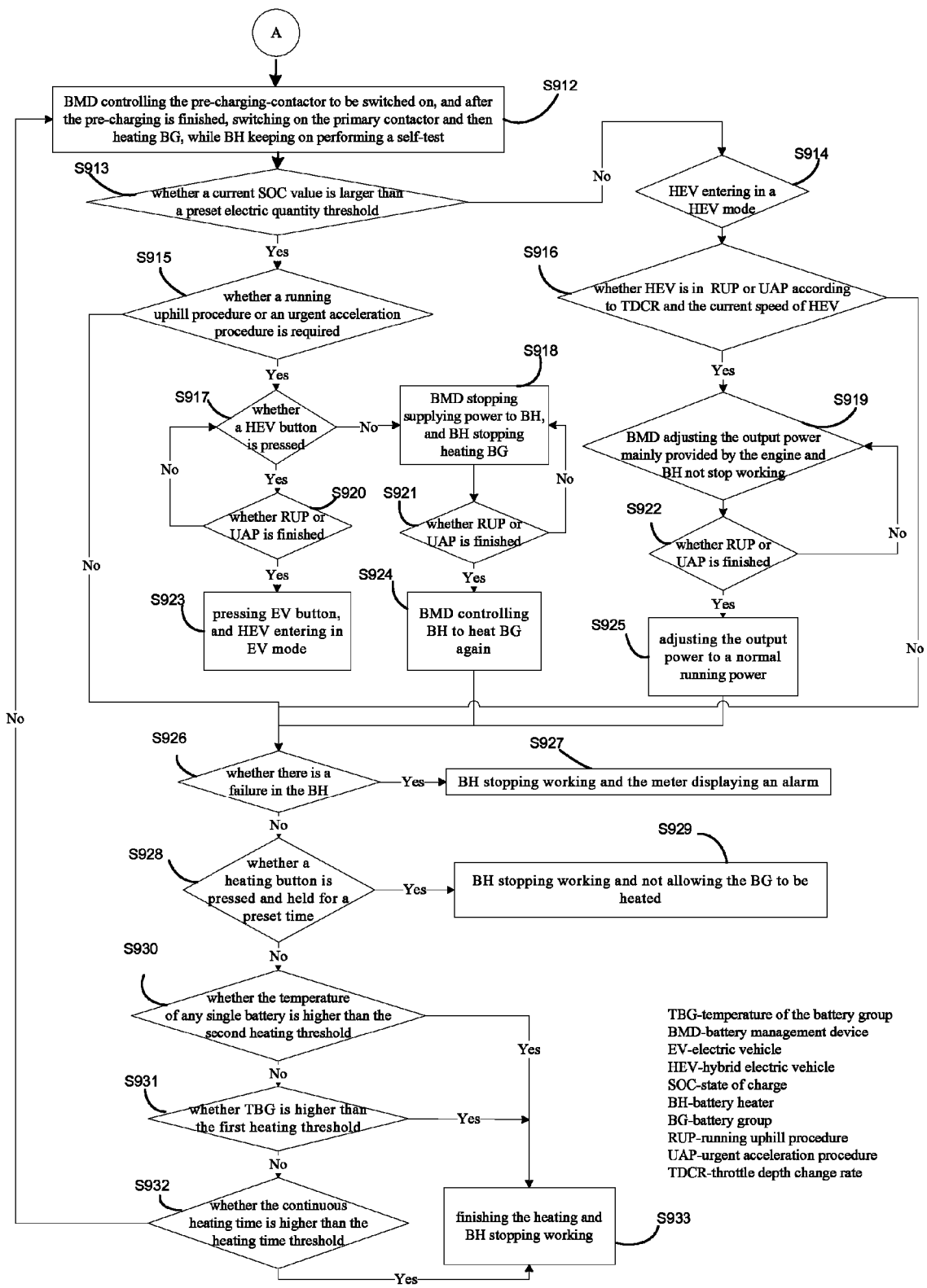
Figure 10A:
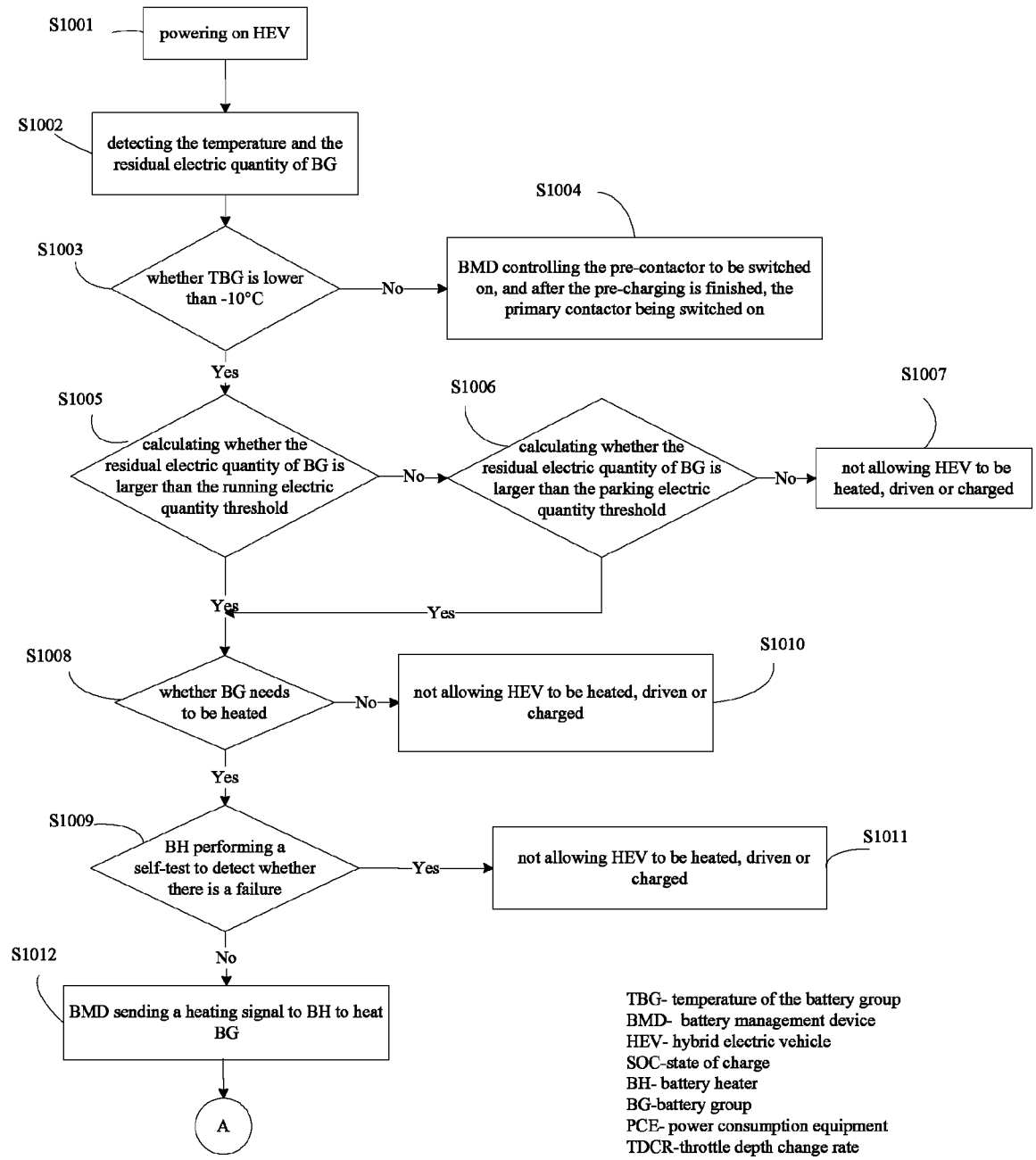
Figure 10B:
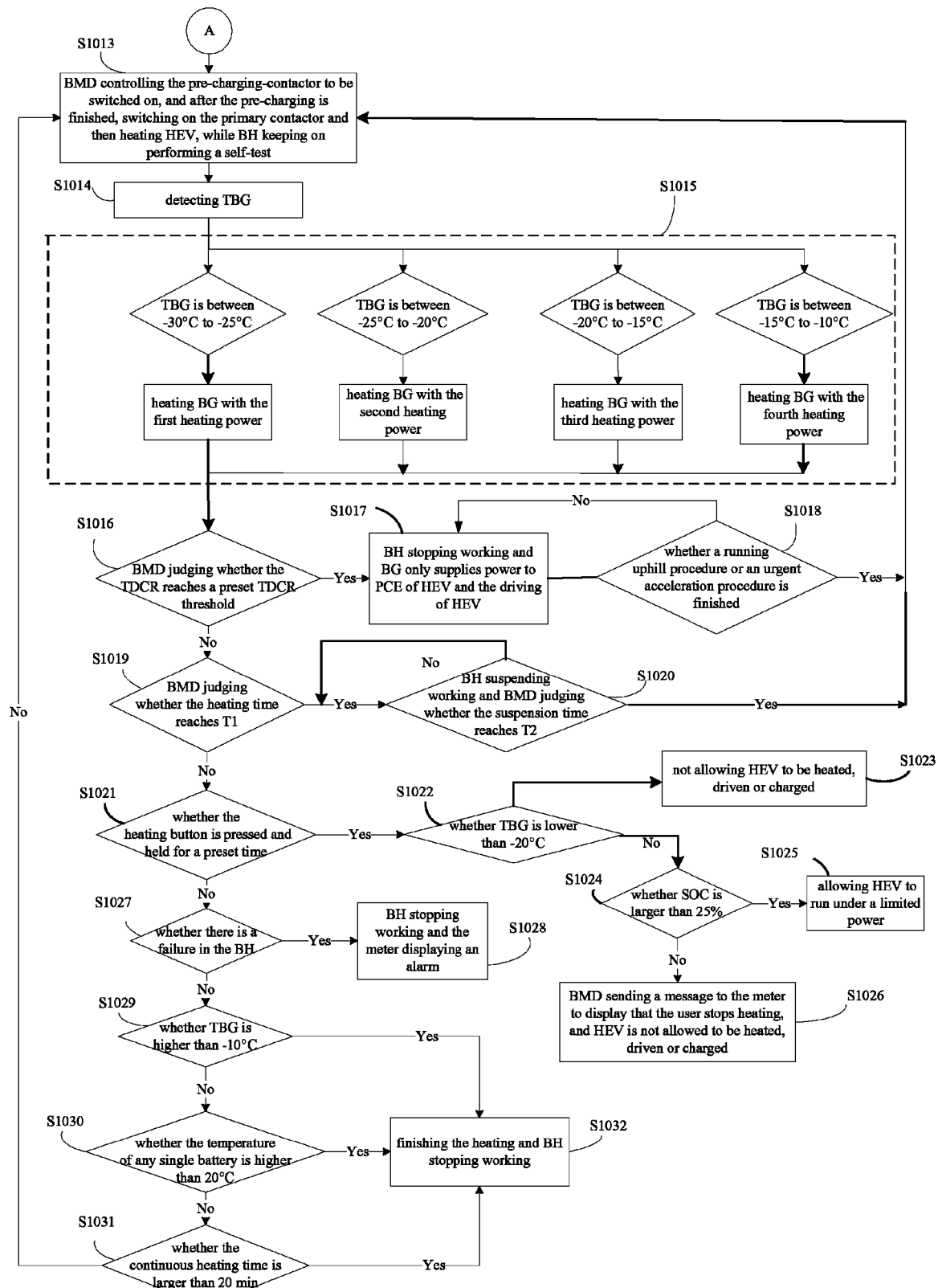

FIG. 1 illustrates a schematic diagram of an electric section of a power system of a hybrid electric vehicle according to an exemplary embodiment;

FIG. 2 illustrates a schematic diagram of an electric section of a power system of a hybrid electric vehicle according to an exemplary embodiment;

FIG. 3 illustrates an electric principle diagram of a power system of a hybrid electric vehicle according to an exemplary embodiment;

FIG. 4 illustrates an electric connection diagram of an electric section of a power system of a hybrid electric vehicle according to an exemplary embodiment;

FIG. 5 illustrates an electric connection diagram of an electric section a power system of a hybrid electric vehicle according to an exemplary embodiment;

FIG. 6 illustrates a schematic diagram of an electric distribution box in a power system of a hybrid electric vehicle according to an exemplary embodiment;

FIG. 7 illustrates a schematic diagram of a power system of a hybrid electric vehicle according to an exemplary embodiment;

FIG. 8 illustrates a flow chart of a method for heating a battery group of a hybrid electric vehicle according to an exemplary embodiment;

FIGS. 9A-9B illustrate a flow chart of a method for heating a battery group of a hybrid electric vehicle according to an exemplary embodiment; and FIGS. 10A-10B illustrates a flow chart of a method for heating a battery group of a hybrid electric vehicle according to an exemplary embodiment.

DETAILED DESCRIPTION

Reference will now be made in detail to exemplary embodiments, examples of which are illustrated in the accompanying drawings. It is readily appreciated by those having ordinary skill in the art that the presently claimed subject matter may be embodied in many different forms and should not be construed as limited to the embodiments set forth herein.

In the description, relative terms such as "longitudinal", "lateral", "lower", "upper", "front", "rear", "left", "right", "horizontal", "vertical", "above", "below", "up", "top", "bottom" "external", "internal" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the description, terms concerning attachments, coupling and the like, such as "connected" and "interconnected", refer to a relationship in which structures are secured or attached to one another through mechanical or electrical connection, or directly or indirectly through intervening structures, unless expressly described otherwise. Specific implications of the above phraseology and terminology may be understood by those skilled in the art according to specific situations.

Referring to FIG. 1, FIG. 2 and FIG. 7, in certain embodiments of the present disclosure, a power system of a hybrid electric vehicle comprises: a battery group 101, a battery heater 102, a battery management device 103, an electric distribution box 104, a motor 105, a motor controller 106, an isolation inductor L2, and an engine 702.

The battery heater 102 is connected with the battery group 101 and configured to charge and discharge the battery group 101 to heat the battery group 101. The battery management device 103 is connected with the battery heater 102 via a CAN (controller area network) cable 107 and connected with the battery group 101 via a sampling cable 108 to sample the temperature and voltage of each battery and the output current of the battery group 101. In addition, the battery management device 103 is also configured to judge the current status of the hybrid electric vehicle, to calculate the temperature and the residual electric quantity of the battery group 101, and to send the control signals to the relevant electric devices via the CAN cable 107 so as to manage the related electric devices.

Specifically, if the temperature of the battery group 101 is lower than a first heating threshold and a residual electric quantity of the battery group 101 is larger than a running electric quantity threshold, the battery management device 103 is configured to control the battery heater 102 to heat the battery group 101 with a first power when the hybrid electric vehicle is in an electric vehicle mode and to control the battery heater 102 to heat the battery group 101 with a second power when the hybrid electric vehicle is in a hybrid electric vehicle mode, in which the second power is larger than the first power.

The electric distribution box 104 is a high voltage device for turning on and off the large current. A voltage output by the battery group 101 is distributed by the battery management device 103 by sending a control signal to the electric distribution box 104. The motor controller 106 is connected with the motor 105 and the electric distribute box 104 respectively, and comprises a first input terminal, a second input terminal and a pre-charging capacitor C2 connected between the first input terminal and the second input terminal. The motor controller 106 is configured to supply power to the motor 105 according to a control command and a voltage distributed to the motor controller 106 by the electric distribution box 104.

Specifically, as shown in FIG. 7, the motor 105 comprises a first motor 701 and a second motor 705. The first motor 701 is connected with the engine 702, and the motor controller 106 is connected with the first motor 701, the second motor 705, and the electric distribution box 104 respectively. The motor controller 106 is configured to supply power to the first motor 701 and the second motor 705 according to the control command and the voltage distributed by the electric distribution box 104 respectively.

In other words, the motor controller 106 converts the DC supplied by the battery group 101 into the three-phase AC required by the first motor 701 and the second motor 705 to supply power to the first motor 701 and the second motor 705 by the internal driving circuit of the motor controller 106, and controls the first motor 701 and the second motor 705 according to the control signal sent by the battery management device 103. The isolation inductor L2 is connected between the battery group 101 and the electric distribution box 104, and the inductance of the isolation inductor L2 matches with the capacitance of the pre-charging capacitor C2. The power system further comprise a heating controller 704 connected with the battery heater 102 and configured to control the operation of the battery heater 102 directly. Information such as a failure or a heating state (such as, the heating of the battery group 101 is finished) existing in the battery heater 102 may be sent to a meter 703 by the battery management device 103 to display the information.

Referring to FIG. 7, the power system of the hybrid electric vehicle according to embodiments of the present disclosure has three power output modes: a series mode, a parallel mode, and a series-parallel mode. In the series mode, the second motor 705 drives the hybrid electric vehicle directly, the engine 702 supplies power to the second motor 705 through the first motor 701, and the battery group 101 is charged by the engine 702 through the first motor 701. In the parallel mode, the second motor 705 and the engine 702 can drive the hybrid electric vehicle simultaneously or independently. The series-parallel mode is a combination of the series mode and the parallel mode, in which the hybrid electric vehicle can operate in the series mode and/or in the parallel mode.

In one embodiment of the present disclosure, the battery heater 102 may be configured to perform a failure self-test and send a test result to the battery management device 103.

Referring to FIG. 3, the battery heater 102 comprises: a first switch module 301, a first capacitor C1, a first inductor L1 and a second switch module 302. A first terminal of the first switch module 301 is connected with a first electrode of the battery group 101 and the isolation inductor L2 respectively. A first terminal of the first capacitor C1 is connected with a second terminal of the first switch module 301, and a second terminal of the first capacitor C1 is connected with a second electrode of the battery group 101. A first terminal of the first inductor L1 is connected with a node between the first switch module 301 and the first capacitor C1. A first terminal of the second switch module 302 is connected with a second terminal of the first inductor L1, and a second terminal of the second switch module 302 is connected with the second electrode of the battery group 101.

The control terminal of the first switch module 301 and the control terminal of the second switch module 302 are connected with the battery management device 103. The battery management device 103 sends a heating signal to the control terminal of the first switch module 301 and the control terminal of the second switch module 302 to control the first switch module 301 and the second switch module 302 to turn on in turn so as to generate a charge current and a discharge current in turn. When the first switch module 301 is on, the second switch module 302 is off, and when the second switch module 302 is on, the first switch module 301 is off.

Referring to FIG. 3, the ESR is an equivalent resistor of the battery group 101, the ESL is an equivalent inductor of the battery group 101, and E is a battery package. L2 is an isolation inductor and is configured to isolate the battery heating circuit Part 2 from the motor equivalent load circuit Part 5. Therefore, the reversed voltage of the battery group 101 is absorbed by the isolation inductor L2 and may not be applied to the load follow-up. C2 (Part 4) is a pre-charging capacitor; and R (Part 5) is the equivalent load of the motor. When the battery heater is operational, the internal switch modules thereof turn on or off in a certain timing sequence.

Referring to FIG. 3, according to one embodiment of the present disclosure, the switch module (e.g., the first switch module 301 or the second switch module 302) may be an insulated gate bipolar transistor (IGBT). When the battery heater starts to work, the internal elements of the battery heater such as inductors, capacitors are in an initial status and do not store any energy. The operation procedure of the battery heater is described below.

When the IGBT1 is on and the IGBT2 is off, the battery package E charges the first capacitor C1 by the charging loop "E-ESR-ESL-D1-C1-E". After the battery package E has charged the first capacitor C1 for a time period, the voltage of the first capacitor C1 is equal to the voltage of the battery package E. But because there is an inductive element in the battery heater, the first capacitor C1 continues being charged so that the voltage of the first capacitor C1 is higher than that of the battery package. When the charge current is zero, the first capacitor C1 begins to discharge by the discharging loop "C1-D1-ESL-ESR-E-C1" until the discharge current is zero.

When the IGBT1 is off and the IGBT2 is on, the first capacitor C1 continues discharging by the discharging loop "C1-D2-L1-IGBT2-C1". Because there is the first inductor L1, the first capacitor C1 continues to discharge so that the voltage of the first capacitor C1 is lower than that of the battery package E. The above process is thus repeated.

In one embodiment of the present disclosure, the isolation inductor L2 may prevent the pre-charging capacitor C2 from charging the first capacitor C1 through the first switch module 301 so that the current waveform of the first capacitor C1 may be controlled and thus the characteristics of the heating circuit may be controlled. Therefore, the circuit may run normally. As a result, when the motor 105 and the battery heater 102 operate simultaneously, the isolation inductor L2 may be needed.

In one embodiment of the present disclosure, the inductance L of the isolation inductor L2 may be determined according to the formula $T=2\pi\sqrt{LC}$, where T is an equivalent load operational period of the motor 105 and C is the capacitance of the pre-charging capacitor C2. The battery heater 102 needs to control the IGBT modules and switch on/off the first switch module 301 or the second switch module 302. Assuming that a switching frequency of the first switch module 301 or the second switch module 302 is t, in order to reduce the influence of the battery heater 102 on the motor controller 106, it may be assumed that a period of a circuit comprising the isolation inductor L2 and the pre-charging capacitor C2 is T. In one embodiment, T>10t, thus meeting the design requirements. Therefore, as used herein, the expression "T is an equivalent load operational period of the motor 105" means that T is the cycle of the circuit comprising the isolation inductor L2 and the pre-charging capacitor C2.

In one embodiment of the present disclosure, the battery heater 102 further comprises a power connector configured to connect and fasten a power cable 109. The power connector needs to satisfy the requirement of the anti-vortex. When the battery heater 102 is operational, the frequency of the current is changed very quickly, which leads to sharp increase in the temperature of the magnetic material in the power connector, so the magnetic permeability of the power connector needs to be low. In one embodiment of the present disclosure, the battery heater 102 further comprises a low voltage connector, which is connected and communicates with an external system. The low voltage connector comprises a CAN cable 107 configured to connect to the battery management device 103, a self-test signal cable and a failure signal cable.

Referring to FIG. 2 and FIG. 4, in one embodiment of the present disclosure, the isolation inductor L2 is disposed in the battery heater 102. A fuse 401 is also disposed in the battery heater 102. As shown in FIG. 4, the battery heater 102 comprises the isolation inductor L2, the fuse 401 and a power supply for the battery heater 102. The battery heater 102 further comprises four power connectors, in which two power connectors are connected to the battery group 101 via the power cable 109 and the other two power connectors are connected to the electric distribution box 104 via the power cable 109. In one embodiment of the present disclosure, the power connectors are used in the head end and the tail end of a high voltage cable.

In one embodiment of the present disclosure, the isolation inductor L2 is disposed in the battery heater 102, and when the battery group 101 does not need to be heated, the battery heater 102 may be removed, so that the electric distribution box 104 may be connected directly to the battery group 101. The hybrid electric vehicle does not need any battery heater in a high temperature area but needs the battery heater in a low temperature area. Therefore, if the hybrid electric vehicle needs to be modified to adapt to different areas, the modification may be small, thus greatly reducing the cost.

Referring to FIG. 1 and FIG. 5, in one embodiment of the present disclosure, the isolation inductor L2 may be disposed in the electric distribution box 104. No matter the isolation inductor L2 is disposed in the battery heater 102 or the electric distribution box 104, the isolation inductor L2 is disposed between the battery group 101 and the electric distribution box 104. Referring to FIG. 1, the electric distribution box 104 is not connected to the battery heater 102 directly. The battery group 101 comprises four power connectors, in which two power connectors are connected to the battery heater 102 via two power cables 109 and the other two power connectors are connected to the electric distribution box 104 via another two power cables 109. In this embodiment, the power system of the hybrid electric vehicle further comprises a relay 501 configured to select whether the isolation inductor L2 is connected to the circuit, as shown in FIG. 5. The battery heater 102 is connected in parallel with the electric distribution box 104. The fuse 401 is mounted in the battery group 101.

The isolation inductor L2 is disposed in the electric distribution box 104 so that the influence on the electric distribution box 104 by the battery heater 102 may be greatly reduced. Furthermore, when the battery heater 102 is operational, the isolation inductor L2 may be connected into the circuit by the relay 501, and when the battery heater 102 is not operational, the isolation inductor L2 may be disconnected from the circuit by the relay 501.

In one embodiment of the present disclosure, as shown in FIGS. 1-3 and FIG. 7, the power system of the hybrid electric vehicle further comprises a cooling assembly 110 configured to cool the first switch module 301 and the second switch module 302.

In one embodiment of the present disclosure, the cooling assembly 110 comprises: a wind channel arranged in the battery heater 102; and a fan arranged at one end of the wind channel. The fan is used to dissipate heat for the battery heater 102.

In another embodiment of the present disclosure, the cooling assembly 110 comprises: a coolant channel arranged in the battery heater 102; and a coolant inlet and a coolant outlet arranged in the battery heater 102 respectively. The heat dissipation effect and the sealing performance of the battery heater may be improved by using the coolant to cool the battery heater.

Referring to FIG. 6, the electric distribution box 104 comprises: a primary contactor 601 and a pre-charging-contactor 602. The primary contactor 601 is configured to distribute the voltage output by the battery group 101 to power consumption equipment, such as the motor 105 of the hybrid electric vehicle. The pre-charging-contactor 602 is connected with the first input terminal 603 or the second input terminal 604 of the motor controller 106, and configured to charge the pre-charging capacitor C2 under the control of the battery management device 103 before the motor controller 106 controls the motor 105 to start.

In one embodiment of the present disclosure, when the residual electric quantity (also named as state of charge or SOC) of the battery group 101 is larger than a parking electric quantity threshold but lower than a running electric quantity threshold, the hybrid electric vehicle is allowed to enter in a parking heating mode; and when the residual electric quantity of the battery group 101 is larger than the running electric quantity threshold, the hybrid electric vehicle is allowed to enter in an electric vehicle mode or a hybrid electric vehicle mode. The running electric quantity threshold is larger than the parking electric quantity threshold.

When the hybrid electric vehicle is in the electric vehicle mode, besides the battery group 101 being heated by the battery heater 102, other high voltage power consumption equipment of the hybrid electric vehicle such as a motor and an air conditioner may work simultaneously under a limited power. Accordingly, the parking heating mode means that except the battery group 101 being heated by the battery heater 102, the other high voltage power consumption equipment of the hybrid electric vehicle, such as the motor and the air conditioner, does not work. The running electric quantity threshold is a first predetermined residual electric quantity of the battery group when the hybrid electric vehicle is allowed to enter in the electric vehicle mode, and the parking electric quantity threshold is a second predetermined residual electric quantity of the battery when the hybrid electric vehicle is allowed to enter in the parking heating mode.

In one embodiment of the present disclosure, the power system further comprises a heating button connected with the battery management device 103. When the heating button is pressed, the battery management device 103 sends a heating signal to the battery heater 102 to control the battery heater 102 to heat the battery group 101. The battery management device 103 is further configured to: after controlling the battery heater 102 to heat the battery group 101, if the heating button is pressed again, judge whether the operation of pressing the heating button satisfies a preset condition (i.e., judge whether the heating button is pressed and held for a preset time) and, if yes, control the hybrid electric vehicle and/or the battery heater 102 according to the temperature and the residual electric quantity of the battery group 101.

Specifically, if the temperature of the battery group 101 is lower than a first temperature threshold, the battery management device 103 indicates to inhibit the hybrid electric vehicle from being heated, driven or charged; and if the temperature of the battery group 101 is higher than the first temperature threshold, the battery management device 103 further judges whether the residual electric quantity of the battery group 101 is larger than a first electric quantity threshold. Specifically, if the residual electric quantity of the battery group 101 is lower than the first electric quantity threshold and the temperature of the battery group 101 is higher than the first temperature threshold, the battery management device 103 indicates to inhibit the hybrid electric vehicle from being heated, driven or charged; and if the residual electric quantity of the battery group 101 is larger than the first electric quantity threshold and the temperature of the battery group 101 is higher than the first temperature threshold, the battery management device 103 allows the hybrid electric vehicle to run under a limited power.

In one embodiment of the present disclosure, the first temperature threshold may be −20° C., and the first electric quantity threshold may be 25% of the total electric quantity of the battery group 101.

In one embodiment of the present disclosure, the battery management device 103 is configured to adjust the output power of the battery heater 102 according to the real-time temperature of the battery group 101 to heat the battery group 101 by different heating procedures. Specifically, when the temperature of the battery group 101 is higher than a third heating threshold and lower than a fourth heating threshold, the battery management device 103 controls the battery heater 102 to heat the battery group 101 with a first heating power.

When the temperature of the battery group 101 is higher than a fourth heating threshold and lower than a fifth heating threshold, the battery management device 103 controls the battery heater 102 to heat the battery group 101 with a second heating power, in which the second heating power is lower than the first heating power.

When the temperature of the battery group 101 is higher than a fifth heating threshold and lower than a sixth heating threshold, the battery management device 103 controls the battery heater 102 to heat the battery group 101 with a third heating power, in which the third heating power is lower the second heating power.

When the temperature of the battery group 101 is higher than a sixth heating threshold and lower than a seventh heating threshold, the battery management device 103 controls the battery heater 102 to heat the battery group 101 with a fourth heating power, in which the fourth heating power is lower than the third heating power. In one embodiment of the present disclosure, the third heating threshold may be −30° C., the fourth heating threshold may be −25° C., the fifth heating threshold may be −20° C., the sixth heating threshold may be −15° C., and the seventh heating threshold may be −10° C.

In one embodiment of the present disclosure, the battery management device 103 is further configured to judge whether the current throttle depth change rate of the hybrid electric vehicle reaches the preset throttle depth change rate threshold, and to control the battery heater to stop heating the battery group when the current throttle depth change rate of the hybrid electric vehicle reaches the preset throttle depth change rate threshold and if the hybrid electric vehicle is not in the hybrid electric vehicle mode. At this time, the battery group only supplies power to the power consumption equipment of the hybrid electric vehicle and a driving of the hybrid electric vehicle.

It should be understood that the throttle depth change rate is determined according to a change value of the throttle depth within a certain time period. In other words, a driver determines whether the battery heater is controlled to heat the battery group according to the change in the throttle depth within a certain time period. In one embodiment of the present disclosure, if the hybrid electric vehicle has finished running uphill or finished an urgent acceleration procedure, the battery management device controls the battery heater to continue heating the battery group; or else, the battery management device controls the battery heater to stop heating the battery group, and the battery group only supplies power to the power consumption equipment of the hybrid electric vehicle and the driving of the hybrid electric vehicle.

With the power system of the hybrid electric vehicle of the present disclosure, by using the battery group to discharge with large current and by the heating of the internal resistor of the battery group, the battery group may be heated. Without any external power supply, the electric quantity for heating is totally provided by the battery group. A heating management may be performed for the battery group by the battery management device and the battery heater, which may greatly reduce the restriction on the use of the hybrid electric vehicle at the low temperature and satisfy the requirement of running and charging at the low temperature. That is, the battery group may be heated while the hybrid electric vehicle may run under a limited power. Moreover, the power system of the hybrid electric vehicle heats the battery group directly, and therefore, a higher heating efficiency, a lower cost, a better utility, an improved safety and an easy industrialization may be achieved.

According to an embodiment of the present disclosure, a hybrid electric vehicle is provided. The hybrid electric vehicle comprises the power system of the hybrid electric vehicle mentioned above. The hybrid electric vehicle may run in a low temperature environment, and the hybrid electric vehicle may run while the battery group may be heated, thus ensuring a safe and smooth running.

In the following, a method for heating a battery group of a hybrid electric vehicle is described in detail with reference to FIGS. 8-10. In FIGS. 8-10, the detailed values (such as, −10° C.) are only illustrative to explain various thresholds (such as the first heating threshold), but not used to limit the scope of the present disclosure. The values of various thresholds may be changed according to actual conditions, which is obvious for a person skilled in the art. Furthermore, the executing orders of the steps in FIGS. 8-10 are only illustrative and exemplary, but not used to limit the scope of the present disclosure. The executing order of the steps may be changed according to actual conditions, which is also obvious for a person skilled in the art.

Referring to FIG. 8, a method for heating a battery group of a hybrid electric vehicle is provided. The method comprises the following steps.

At step S801, a temperature and a residual electric quantity of the battery group are detected.

At step S802, if the temperature of the battery group is lower than a first heating threshold and the residual electric quantity of the battery group is larger than a running electric quantity threshold, an operation mode of the hybrid electric vehicle is judged.

At step S8021, the battery heater is controlled to heat the battery group with a first power if the hybrid electric vehicle is in an electric vehicle mode.

At step S8022, the battery heater is controlled to heat the battery group with a second power if the hybrid electric vehicle is in a hybrid electric vehicle mode, in which the second power is higher than the first power.

At step S803, the battery group is inhibited from being heated or charged and the hybrid electric vehicle is inhibited from being driven if the temperature of the battery group is lower than the first heating threshold and the residual electric quantity of the battery group is lower than the parking electric quantity threshold.

According to an embodiment of the present disclosure, referring to FIGS. 9A-9B, the method for heating the battery group of the hybrid electric vehicle may comprise the following steps.

At step S901, the hybrid electric vehicle is powered on.

At step S902, the temperature and the residual electric quantity of the battery group are detected.

At step S903, it is judged whether the temperature of the battery group is lower than the first heating threshold. If yes, step S905 is followed, and if no, step S904 is followed.

At step S904, the battery management device controls the pre-charging-contactor to be switched on, and after the pre-charging is finished, the primary contactor is switched on. The hybrid electric vehicle runs normally. Specifically, the battery management device controls the pre-charging-contactor in the electric distribution box to be switched on to charge the pre-charging capacitor and controls the pre-charging-contactor to be switched off after the pre-charging is finished.

At step S905, the battery management device calculates whether the residual electric quantity of the battery group is larger than the running electric quantity threshold. If yes, step S907 is followed, and if no, step S906 is followed.

At step S906, the battery management device sends a message to the meter to display that the residual electric quantity of the battery group is too low so that the hybrid electric vehicle is not allowed to be heated, driven or charged (e.g., the battery group is not heated or charged).

At step S907, the battery management device sends a heating signal to the battery heater to heat the battery group.

At step S908, the battery heater performs a self-test to detect whether there is a failure. If yes, step S909 is followed, and if no, step S910 is followed.

At step S909, the battery management device stops supplying power and sending a message to the battery heater, and sends a message to the meter to display that there is a failure in the battery heater so that the hybrid electric vehicle is not allowed to be heated, driven or charged.

At step S910, the battery management device sends a message to the meter to display that the battery group is allowed to be heated, and a heating button is pressed by a driver to heat the battery group.

At step S911, it is judged whether the heating button is pressed. If yes, step S912 is followed, and if no, step S910 is followed.

At step S912, the battery management device controls the pre-charging-contactor to be switched on, and after the pre-charging is finished, the primary contactor is switched on and then the battery group is heated, while the battery heater keeps on performing a self-test. Specifically, the battery management device calculates the current temperature and the current residual electric quantity of the battery group, calculates the maximum output power of the battery group according to the current temperature and the current residual electric quantity of the battery group, and controls the hybrid electric vehicle to run under a limited power according to the maximum output power.

At step S913, it is judged whether a current SOC value is larger than a preset electric quantity threshold (such as 50% of the total electric quantity of the battery group). If yes, the hybrid electric vehicle enters in an EV (Electric Vehicle) mode and step S915 is followed, and if no, the hybrid electric vehicle enters in an HEV (Hybrid Electric Vehicle) mode and step S914 is followed.

At step S914, the hybrid electric vehicle enters in the HEV mode.

At step S915, it is judged whether a running uphill procedure or an urgent acceleration procedure is required. If yes, step S917 is followed, and if no, step S926 is followed.

At step S916, it is judged whether the hybrid electric vehicle is in the running uphill procedure or the urgent acceleration procedure according to the throttle depth change rate and the current speed of the hybrid electric vehicle. If yes, step S919 is followed, and if no, step S926 is followed.

At step S917, it is judged whether an HEV button is pressed. If yes, step S920 is followed, and if no, step S918 is followed. In an embodiment, when the HEV button is pressed, the hybrid electric vehicle enters in the HEV mode, the output power of the hybrid electric vehicle is mainly provided by the engine, and the battery heater keeps on working.

At step S918, the battery management device stops supplying power to the battery heater, and the battery heater stops heating the battery group, and step S921 is followed. In this step, the hybrid electric vehicle is in an electric vehicle mode, and the output power is mainly provided by the second motor, which reaches a power required by the running uphill procedure or the urgent acceleration procedure.

At step S919, the battery management device adjusts the output power mainly provided by the engine and the battery heater does not stop working, and step S922 is followed.

At step S920, it is detected whether the running uphill procedure or the urgent acceleration procedure is finished. If yes, step S923 is followed, and if no, step S917 is followed.

At step S921, it is detected whether the running uphill procedure or the urgent acceleration procedure is finished. If yes, step S924 is followed, and if no, step S918 is followed.

At step S922, it is detected whether the running uphill procedure or the urgent acceleration procedure is finished. If yes, step S925 is followed, and if no, step S919 is followed.

At step S923, an EV button is pressed and the hybrid electric vehicle enters in the EV mode, and step S926 is followed.

At step S924, the battery management device controls the battery heater to heat the battery group again, and step S926 is followed.

At step S925, the motor controller adjusts the output power to a normal running power, and step S926 is followed.

At step S926, it is detected whether there is a failure in the battery heater. If yes, step S927 is followed, and if no, step S928 is followed.

At step S927, the battery heater stops working and the meter displays an alarm so that the hybrid electric vehicle is not allowed to be heated, driven or charged.

At step S928, it is detected whether the heating button is pressed and held for a preset time. If yes, step S929 is followed, and if no, step S930 is followed. In an embodiment, the preset time may be about 2 seconds.

At step S929, the battery heater stops working and the battery management device sends a message to the meter to display that the battery group is not allowed to be heated.

At step S930, it is detected whether the temperature of any single battery in the battery group is higher than the second heating threshold. If yes, step S933 is followed, and if no, step S931 is followed.

At step S931, it is detected whether the temperature of the battery group is larger than the first heating threshold. If yes, step S933 is followed, and if no, step S932 is followed.

At step S932, it is detected whether the continuous heating time is larger than the heating time threshold. If yes, step S933 is followed, and if no, step S912 is followed.

At step S933, the heating is finished and the battery heater stops heating the battery group.

In one embodiment of the present disclosure, the first heating threshold may be −10° C., the second heating threshold may be 20° C., and the heating time threshold may be 20 minutes.

Specifically, the method for heating the battery group in the hybrid electric vehicle comprises the following steps.

(1) The hybrid electric vehicle is powered on, the battery management device controls the pre-charging-contactor to be switched on, the motor controller receives a starting message to start to charge the pre-charging capacitor, and after the pre-charging is finished, the primary contactor is not switched on at that time. Because an instant charging may cause a large impact on the motor controller, a pre-charging capacitor is needed. The pre-charging capacitor may be fully charged and then discharge smoothly, so that the motor controller can be protected.

(2) The battery management device judges whether the temperature of the battery group (collected by a battery information collector) is lower than a first heating threshold (for example, the first heating threshold may be in a range from about −10° C. to about −5° C. As battery groups of different vehicles may have different properties, and the battery groups may possess different discharging temperature ranges, so the first heating threshold may vary accordingly). If the temperature of the battery group is higher than the first heating threshold, the battery management device controls the primary contactor in the electric distribution box to be switched on and the hybrid electric vehicle runs normally. If the temperature of the battery group is lower than the first heating threshold, the battery management device detects whether the residual electric quantity of the battery group satisfies the requirement of a running heating mode.

(3) If the residual electric quantity of the battery group does not satisfy the requirement of the running heating mode, the battery management device sends a message to the meter to display that the residual electric quantity of the battery group is too low so that the hybrid electric vehicle is not allowed to be heated, driven or charged. If the residual electric quantity of the battery group satisfies the requirement of the running heating mode, the battery management device sends a heating signal to the battery heater to heat the battery group.

(4) The battery heater performs a self-test to detect whether there is a failure, if there is a failure, the battery management device stops supplying power and sending a message to the battery heater, and sends a message to the meter to display that there is a failure in the battery heater so that the hybrid electric vehicle is not allowed to be heated, driven or charged; and if there is no failure, the battery management device sends a message to the meter to display that the battery group is allowed to be heated, and a heating button is pressed by a driver to heat the battery group. The driver can heat the battery group via a switch of the battery heater, if the switch is switched on, the battery management device controls the primary contactor to be switched on to heat the hybrid electric vehicle, and sends a current maximum output power to the power system. The battery group has poor discharging performance in a low temperature environment, which cannot provide large current discharging while heating the hybrid electric vehicle, and thus the output power of the motor needs to be limited.

(5) The battery management device judges whether a current SOC value is larger than a preset electric quantity threshold (such as 50% of the total electric quantity of the battery group). If yes, the hybrid electric vehicle enters in an EV mode, and if no, the hybrid electric vehicle enters in an HEV mode. In the HEV mode, the driving power is mainly provided by the engine, and therefore the heating power in the HEV mode is higher than that in the EV mode.

(6) The driver judges whether a running uphill procedure or an urgent acceleration procedure is required. In the EV mode, the driver can control a HEV button to achieve the power required by the running uphill procedure or the urgent acceleration procedure. Since the power is mainly provided by the engine, the battery heater does not need to be turned off. If the HEV button is not pressed, the battery management device judges whether the hybrid electric vehicle is in the running uphill procedure or the urgent acceleration procedure according to the throttle depth change rate and the current speed of the hybrid electric vehicle, if yes, the battery management device stops supplying power to the battery heater and the battery heater stops heating the battery group, and the battery management device controls the battery heater to heat the battery group again until the running uphill procedure or the urgent acceleration procedure is finished. In the HEV mode, the battery management device is capable of judging whether the running uphill procedure or the urgent acceleration procedure is required according to the throttle depth change rate and the current speed of the hybrid electric vehicle, if yes, the battery management device controls the output power. Because the output power is mainly provided by the engine, the battery heater does not need to be turned off. If the battery heater needs to be turned off, the switch of the heating controller is switched off. After the running uphill procedure or the urgent acceleration procedure is finished, if the temperature of the battery group still does not reach a preset temperature, then the switch of the battery heater is switched on.

(7) The battery management device keeps on detecting the temperature and the heating time of the battery group. The battery management device detects whether the temperature of any single battery in the battery group is higher than the second heating threshold (for example, the second heating threshold may be about 10° C. to about 20° C.). If yes, the battery heater stops working, the battery management device adjusts the SOC, and the hybrid electric vehicle runs normally; and if no, the battery heater continues heating the battery group. The battery management device judges whether the continuous heating time is larger than the heating time threshold (for example, the heating time threshold may be about 5 minutes to about 10 minutes). If yes, the battery heater stops heating the battery group; and if no, the battery heater continues heating the battery group. The battery management device further judges whether the temperature of the battery group is higher than the first heating threshold (for example, the first heating threshold may be about −10° C. to about 10° C.). If yes, the battery heater stops heating the battery group; and if no, the battery heater continues heating the battery group.

(8) The battery management device detects whether the control switch of the battery heater is switched off. If yes, the battery heater stops heating the battery group, and the battery management device sends a message to the meter to display that the battery heater stops heating the battery group.

(9) During the heating process, the heating system performs the self-test to detect whether there is a failure. If yes, the battery heater stops working and the meter displays an alarm so that the hybrid electric vehicle is not allowed to be heated, driven or charged.

According to an embodiment of the present disclosure, referring to FIGS. 10A-10B, the method for heating the battery group of the hybrid electric vehicle may comprise the following steps.

At step S1001, the hybrid electric vehicle is powered on.

At step S1002, the temperature and the residual electric quantity of the battery group are detected.

At step S1003, it is judged whether the temperature of the battery group is lower than the first heating threshold. If yes, step S1005 is followed, and if no, step S1004 is followed.

At step S1004, the battery management device controls the pre-charging-contactor to be switched on, and after the pre-charging is finished, the primary contactor is switched on. The hybrid electric vehicle runs normally.

At step S1005, the battery management device calculates whether the residual electric quantity of the battery group is larger than the running electric quantity threshold. If yes, step S1008 is followed, and if no, step S1006 is followed.

At step S1006, the battery management device calculates whether the residual electric quantity of the battery group is larger than the parking electric quantity threshold. If yes, step S1008 is followed, and if no, step S1007 is followed. The running electric quantity threshold is larger than the parking electric quantity threshold.

At step S1007, the battery management device sends a message to the meter to display that the residual electric quantity of the battery group is too low so that the hybrid electric vehicle is not allowed to be heated, driven or charged.

At step S1008, a user confirms whether the battery group needs to be heated. If yes, step S1009 is followed, and if no, step S1010 is followed.

At step S1009, the battery heater performs a self-test to detect whether there is a failure. If yes, step S1011 is followed, and if no, step S1012 is followed.

At step S1010, the battery management device sends a message to the meter to display that the hybrid electric vehicle is not allowed to be heated. The battery management device judges whether the temperature of the battery group is higher than a first temperature threshold and the residual electric quantity of the battery group is larger than a first electric quantity threshold. If yes, the hybrid electric vehicle is allowed to run under a limited power; and if no, the hybrid electric vehicle is not allowed to be driven or charged. In one embodiment, the first temperature threshold may be −20° C., and the first electric quantity threshold may be about 25% of the total electric quantity of the battery group.

At step S1011, the battery management device stops supplying power and sending a message to the battery heater, and sends a message to the meter to display that there is a failure in the battery heater so that the hybrid electric vehicle is not allowed to be heated, driven or charged.

At step S1012, the battery management device sends a heating signal to the battery heater to heat the battery group.

At step S1013, the battery management device controls the pre-charging-contactor to be switched on, and after the pre-charging is finished, the primary contactor is switched on and then the battery group is heated, while the battery heater keeps on performing a self-test. Specifically, the battery management device calculates the current temperature and the current residual electric quantity of the battery group, calculates the maximum output power of the battery group according to the current temperature and the current residual electric quantity of the battery group, and controls the hybrid electric vehicle to run under a limited power according to the maximum output power.

At step S1014, the temperature of the battery group is detected.

At step S1015, when the temperature of the battery group is higher than the third heating threshold and lower than the fourth heating threshold, the battery management device controls the battery heater to heat the battery group with the first heating power. When the temperature of the battery group is higher than the fourth heating threshold and lower than the fifth heating threshold, the battery management device controls the battery heater to heat the battery group with the second heating power, in which the second heating power is lower than the first heating power. When the temperature of the battery group is higher than the fifth heating threshold and lower than the sixth heating threshold, the battery management device controls the battery heater to heat the battery group with the third heating power, in which the third heating power is lower than the second heating power. When the temperature of the battery group is higher than the sixth heating threshold and lower than the seventh heating threshold, the battery management device controls the battery heater to heat the battery group with the fourth heating power, in which the fourth heating power is lower than the third heating power.

At step S1016, the battery management device judges whether the throttle depth change rate of the hybrid electric vehicle reaches the preset throttle depth change rate threshold according to the throttle depth message. If yes, step S1017 is followed, and if no, step S1019 is followed.

At step S1017, the battery heater stops working and the battery group only supplies power to the power consumption equipment of the hybrid electric vehicle and the driving of the hybrid electric vehicle.

At step S1018, it is judged whether a running uphill procedure or an urgent acceleration procedure is finished. If yes, step S1013 is followed, and if no, step S1017 is followed.

At step S1019, the battery management device judges whether the heating time reaches the first preset time period T1. If yes, step S1020 is followed, and if no, step S1021 is followed.

At step S1020, the battery heater suspends working and the battery management device judges whether the suspension time reaches a second preset time period T2. If yes, step S1013 is followed, and if no, step S1020 is followed.

At step S1021, it is judged whether the heating button is pressed and held for a preset time. If yes, step S1022 is followed, and if no, step S1027 is followed. In one embodiment, the preset time may be 2 seconds.

At step S1022, it is judged whether the temperature of the battery group is lower than the first temperature threshold. If yes, step S1023 is followed, and if no, step S1024 is followed.

At step S1023, the hybrid electric vehicle is not allowed to be heated, driven or charged.

At step S1024, it is detected whether the residual electric quantity is larger than the first electric quantity threshold. If yes, step S1025 is followed, and if no, step S1026 is followed.

At step S1025, the hybrid electric vehicle is allowed to run under a limited power.

At step S1026, the battery management device sends a message to the meter to prompt that the user stops heating so that the hybrid electric vehicle is not allowed to be heated, driven or charged.

At step S1027, it is detected whether there is a failure in the battery heater. If yes, step S1028 is followed, and if no, step S1029 is followed.

At step S1028, the battery heater stops working and the meter displays an alarm so that the hybrid electric vehicle is not allowed to be heated, driven or charged.

At step S1029, it is detected whether the temperature of the battery group is higher than the first heating threshold. If yes, step S1032 is followed, and if no, step S1030 is followed.

At step S1030, it is detected whether the temperature of any single battery in the battery group is higher than the second heating threshold. If yes, step S1032 is followed, and if no, step S1031 is followed.

At step S1031, it is detected whether the continuous heating time is larger than the heating time threshold. If yes, step S1032 is followed, and if no, step S1013 is followed.

At step S1032, the heating is finished and the battery heater stops heating the battery group.

In one embodiment of the present disclosure, the third heating threshold may be −30° C., the fourth heating threshold may be −25° C., the fifth heating threshold may be −20° C., the sixth heating threshold may be −15° C., the seventh heating threshold may be −10° C., the first heating threshold may be −10° C., the second heating threshold may be 20° C., the first temperature threshold may be −20° C., the first electric quantity threshold may be 25% of the total electric quantity of the battery group, and the heating time threshold may be 20 minutes.

In some embodiments, when the hybrid electric vehicle is powered on, the battery management device detects the temperature of the battery group and the status of the primary contactor. The temperature of the battery group is an average of temperatures of all single batteries in the battery group. The battery management device samples the temperature of each single battery in the battery group through an information collector and calculates the temperature of the battery group. If the temperature of the battery group is lower than the first heating temperature and the residual electric quantity of the battery group is larger than the parking electric quantity threshold, the user presses and holds the heating button for 2 seconds, and then the battery management device sends a message to the battery heater through the CAN cable to allow the battery group to be heated. Before heating the battery group in the running heating mode, that is, before the motor works, the battery management device sends the control signal to the electric distribution box to control the pre-charging-contactor to be switched on so that the battery group charges the pre-charging capacitor C2. When the voltage of the pre-charging capacitor C2 is substantially equal to that of the battery group, the motor is allowed to work.

In one embodiment of the present disclosure, the heating button is disposed on the meter. Provided that the temperature of the battery group is lower than the first heating threshold and the residual electric quantity of the battery group is larger than the parking electric quantity threshold, when the heating button is pressed, the battery heater is allowed to work. If the heating button is pressed again and held for 2 seconds, the battery heater is forced to stop operating.

The primary contactor is disposed in the electric distribution box and configured to connect the motor controller to a power supply or disconnect the motor controller from a power supply. When the residual electric quantity of the battery group is larger than the running electric quantity threshold, the battery management device sends the control signal to the electric distribution box to control the primary contactor to be switched on so that the motor is allowed to work. The motor controller converts the DC to the three-phase AC required by the motor through the driving circuit, to supply power to the motor and to allow the hybrid electric vehicle to run under a limited power.

The pre-charging-contactor is also disposed in the electric distribution box and connected to the pre-charging capacitor C2 in series. In particular, the pre-charging capacitor C2 is charged before the motor works. The reasons may be as follows. In one aspect, an electrical current shock may be avoided in the pre-charging procedure and an agglomeration caused when the primary contactor is switched on may be avoided. A current limiting resistor is connected in series between the pre-charging capacitor and the pre-charging-contactor. When the pre-charging is finished, the battery management device controls the primary contactor to be switched on and then controls the pre-charging-contactor to be switched off.

In another aspect, since the current is larger at the start moment of the motor, the voltage of the whole battery group is reduced. Therefore, the pre-charging capacitor C2 is charged firstly until the voltage thereof is substantially equal to that of the battery group, and then the motor is started. Because the voltage of the pre-charging capacitor cannot change suddenly, by connecting the pre-charging capacitor and the motor in parallel, the impact on the voltage of the battery group resulting from the start of the motor may be decreased.

When the battery heater receives the heating signal sent by the battery management device, the battery heater performs a self-test to detect whether there is a failure in the battery heater. In one embodiment of the present disclosure, the battery heater sends a single pulse of 0.5 ms to detect whether there is a failure in the battery heater. If there is not any failure, the battery heater sends a control pulse (for example with a cycle of 20 ms and a duty ratio of 20%) to the internal switch module to make the battery group short the circuit in a short time. So the heating purpose is achieved. Meanwhile, the battery heater sends a CAN signal to the meter. The meter receives the CAN signal and displays that "the battery group is being heated".

When the battery group is heated, the battery management device and the battery heater keep on detecting the status of the battery group. If the temperature of the battery group is higher than the first heating threshold, or the continuous heating time is larger than the heating time duration threshold, or the maximum temperature of a single battery in the battery group is higher than the second heating threshold, the battery heater stops sending the control pulse to the internal switch module to stop heating the battery group. Further, the battery heater sends a CAN signal to the meter. The meter receives the CAN signal and displays that "the heating is finished". Thus, the heating procedure is completed. In one embodiment of the present disclosure, the second heating threshold may be 20° C., and the heating time threshold may the 20 minutes. Preferably, in order to avoid a repeated start of the heating procedure, during the heating process, if the temperature of the battery group is detected to be higher than the first heating threshold by 5° C., the battery group is stopped from being heated.

If the temperature of the battery group is higher than the first heating threshold, the battery management device works normally. If the temperature of the battery group is lower than the first heating threshold and the residual electric quantity of the battery group is less than the parking electric quantity threshold, the primary contactor is not switched on and the battery management device sends the CAN signal to the battery heater and the meter, so that the battery group is not allowed to be heated. When the meter receives the CAN signal, the meter displays that "the residual electric quantity of the battery group is not enough" so that the hybrid electric vehicle is not allowed to be heated, driven or charged.

If a failure of the battery heater, including under voltage protection, over-voltage protection, overheat protection, pulse width interval protection or maximum turn-on time protection, appears during the self-test process, it is not allowed to heat the battery group. The battery heater sends a failure signal. The meter receives the failure signal and displays that "a failure in the battery heater". The heating is not allowed.

If any failure of the battery heater, including under voltage protection, over-voltage protection, overheat protection, pulse width interval protection or maximum turn-on time protection, appears during the heating process, the battery heater stops heating the battery group and sends a failure signal. The meter receives the failure signal and displays that "a failure in the battery heater". The heating is ceased.

In some embodiments of the present disclosure, the battery heater comprises a protection circuit to prevent the failures mentioned above. The protection circuit is described in detail as follows.

(1) When there is a failure signal, an IGBT in the battery heater is turned off. An ERROR (failure) pin of the protection circuit is set at a low level, and a failure signal is outputted through an optical coupler. Thus an ERROUT (failure output) pin is at the low level. To release a protection status, the PWM (pulse width modulation) wave should be maintained at a high level for 2 seconds, and then the failure signal is reset and the protection circuit is recovered to a normal status. If the failure signal cannot be reset by the PWM wave in 2 seconds, a permanent error occurs in the protection circuit so that the protection circuit cannot work normally.

(2) To ensure a normal work of a discharge module of the IGBT, the frequency of the pulse sent by a DSP (digital signal processor) may not be too high and the pulse width may not be too long. For example, a maximum pulse width may be 5 ms and a minimum interval may be 7-10 ms, or else a failure signal may be outputted.

(3) In one embodiment of the present disclosure, a DC-DC isolation power supply is used to drive the IGBT. The positive bias voltage for the gate terminal of the IGBT may be +15V, and the negative bias voltage for the gate terminal of the IGBT may be −7V. The negative bias voltage for the gate terminal of the IGBT may turn off the IGBT quickly and avoid a malfunction of turning on the IGBT because of the overlarge surge current.

(4) In one embodiment of the present disclosure, the protection circuit comprises an under voltage protection circuit. The under voltage protection circuit may avoid an increase in the power consumption of the IGBT caused by the deficient driving voltage. When the driving voltage decreases to a first voltage threshold, the under voltage protection circuit starts to work. In one embodiment of the present disclosure, the first voltage threshold may be 9V.

(5) The over-heat protection circuit may avoid the damage to the IGBT caused by the high temperature. The protection circuit samples the temperature by using a thermistor. When the temperature of the IGBT is higher than a safe temperature threshold, the over-heat protection circuit starts to work. The protection circuit may also be configured to detect whether there is an open circuit in the thermistor. When there is an open circuit in the thermistor, the equivalent impedance is infinite and a protection signal is outputted. In one embodiment of the present disclosure, the safe temperature threshold may be 85° C.

(6) Because there is a large inductance in the discharge loop, when the IGBT is turned off, an over-high voltage may be excited by the collector terminal of the IGBT. So a high voltage capacitor is connected in parallel between the collector terminal and the emitter terminal of the IGBT. The over-voltage protection circuit may avoid the over high voltage of the collector terminal to damage the IGBT at the moment of turning off the IGBT. When the voltage of the collector terminal is larger than a second voltage threshold, a protection signal is outputted. In one embodiment of the present disclosure, the second voltage threshold may be 800V.

During the heating process of the battery group, if the user suddenly presses and holds the heating button for 2 seconds, the battery heater stops heating the battery group so that the battery group is not allowed to be charged and the hybrid electric vehicle is not allowed to be driven.

With the method for heating the battery of the power system of the hybrid electric vehicle according to embodiments of the present disclosure, the battery group of the hybrid electric vehicle may be heated without any external power supply. The battery group is heated to a required temperature and then may be charged or discharged normally. So the restriction on the use of the hybrid electric vehicle at the low temperature may be greatly reduced and the requirements of running and charging at the low temperature may be satisfied.

In the preceding specification, the subject matter has been described with reference to specific exemplary embodiments. It will, however, be evident that various modifications and changes may be made without departing from the spirit and scope of the claimed subject matter as set forth in the claims that follow. The specification and drawings are accordingly to be regarded as illustrative rather than restrictive. Other embodiments may be apparent to those skilled in the art from consideration of the specification and practice of the embodiments disclosed herein.

What is claimed is:

1. A power system of a hybrid electric vehicle, comprising:
 a battery group;
 a battery heater, connected with the battery group and configured to charge and discharge the battery group so as to heat the battery group;
 a battery management device, connected with the battery group and the battery heater respectively, and configured to, when a temperature of the battery group is lower than a first heating threshold and a residual electric quantity of the battery group is larger than a running electric quantity threshold, control the battery heater to heat the battery group with a first power when the hybrid electric vehicle is in an electric vehicle mode, and heat the battery group with a second power when the hybrid electric vehicle is in a hybrid electric vehicle mode, wherein the second power is larger than the first power;
an electric distribution box, configured to distribute a voltage output by the battery group;
an engine;
a motor coupled to the engine to provide power for the hybrid electric vehicle;
a motor controller, connected with the motor and the electric distribution box respectively, comprising a first input terminal, a second input terminal and a pre-charging capacitor connected between the first input terminal and the second input terminal, and configured to supply power to the motor according to a control command and a voltage distributed by the electric distribution box; and
an isolation inductor, connected between the battery group and the electric distribution box, wherein an inductance of the isolation inductor matches with a capacitance of the pre-charging capacitor.

2. The power system of claim 1, wherein the motor comprises a first motor and a second motor, in which the first motor is connected with the engine, and the motor controller is connected with the first motor, the second motor and the electric distribution box respectively, and configured to supply power to the first motor and the second motor according to the control command and the voltage distributed by the electric distribution box respectively.

3. The power system of claim 1, wherein the battery management device is further configured to:
control the battery heater to heat the battery group in a parking heating mode when the residual electric quantity of the battery group is larger than a parking electric quantity threshold but lower than the running electric quantity threshold, in which the running electric quantity threshold is larger than the parking electric quantity threshold; and
allow the hybrid electric vehicle to enter into one of the electric vehicle mode and the hybrid electric vehicle mode when the residual electric quantity of the battery group is larger than the running electric quantity threshold.

4. The power system of claim 1, wherein the battery management device is further configured to:
allow the hybrid electric vehicle to enter into one of the electric vehicle mode and the hybrid electric vehicle mode when the residual electric quantity of the battery group is larger than the running electric quantity threshold;
judge whether a current throttle depth change rate of the hybrid electric vehicle reaches a preset throttle depth change rate threshold when the hybrid electric vehicle is in the electric vehicle mode; and
control the battery heater to stop heating the battery group when the hybrid electric vehicle is not in the hybrid electric vehicle mode and the current throttle depth change rate of the hybrid electric vehicle reaches the preset throttle depth change rate threshold.

5. The power system of claim 1, further comprising:
a heating button, connected with the battery management device, wherein the battery management device sends a heating signal to the battery heater to control the battery heater to heat the battery group when the heating button is pressed.

6. The power system of claim 5, wherein the battery management device is further configured to:
after controlling the battery heater to heat the battery group, when the heating button is pressed again, judge whether an operation of pressing the heating button satisfies a preset condition; and
when the operation of pressing the heating button satisfies the preset condition, control at least one of the hybrid electric vehicle and the battery heater according to the temperature of the battery group and the residual electric quantity of the battery group.

7. The power system of claim 6, wherein:
when the temperature of the battery group is lower than a first temperature threshold, the battery management device indicates that the battery group is inhibited from one of being heated and being charged and the hybrid electric vehicle is inhibited from being driven;
when the temperature of the battery group is higher than the first temperature threshold and the residual electric quantity of the battery group is lower than a first electric quantity threshold, the battery management device indicates that the battery group is inhibited from one of being heated and being charged and the hybrid electric vehicle is inhibited from being driven; and
when the temperature of the battery group is higher than the first temperature threshold and the residual electric quantity of the battery group is larger than the first electric quantity threshold, the battery management device allows the hybrid electric vehicle to run under a limited power.

8. The power system of claim 7, wherein the battery management device is further configured to adjust a heating power of the battery heater according to the temperature of the battery group.

9. The power system of claim 7, wherein the battery heater comprises:
a first switch module, wherein a first terminal of the first switch module is connected with a first electrode of the battery group and the isolation inductor respectively;
a first capacitor, wherein a first terminal of the first capacitor is connected with a second terminal of the first switch module, and a second terminal of the first capacitor is connected with a second electrode of the battery group;
a first inductor, wherein a first terminal of the first inductor is connected with a node between the first switch module and the first capacitor; and
a second switch module, wherein a first terminal of the second switch module is connected with a second terminal of the first inductor, and a second terminal of the second switch module is connected with the second electrode of the battery group,
wherein a control terminal of the first switch module and a control terminal of the second switch module are connected with the battery management device, and the battery management device sends the heating signal to the control terminal of the first switch module and the control terminal of the second switch module to control the first switch module and the second switch module to turn on in turn, in which the first switch module is on when the second switch module is off, and the first switch module is off when the second switch module is on.

10. The power system of claim 1, wherein the electric distribution box comprises:
a primary contactor, configured to distribute the voltage output by the battery group to power consumption equipment of the hybrid electric vehicle; and
a pre-charging-contactor, connected with one of the first input terminal and the second input terminal of the motor controller, and configured to charge the pre-charging capacitor under a control of the battery management device before the motor controller controls the motor to start.

11. A hybrid electric vehicle comprising the power system of claim 1.

12. A method for heating a battery group of a hybrid electric vehicle, comprising:
detecting a temperature and a residual electric quantity of the battery group by a battery management device;
when the temperature of the battery group is lower than a first heating threshold and the residual electric quantity of the battery group is larger than a running electric quantity threshold, judging a mode the hybrid electric vehicle is in by the battery management device;
controlling a battery heater to heat the battery group with a first power when the hybrid electric vehicle is in an electric vehicle mode;
controlling the battery heater to heat the battery group with a second power when the hybrid electric vehicle is in a hybrid electric vehicle mode, wherein the second power is higher than the first power; and
indicating that the battery group is inhibited from being heated or charged and the hybrid electric vehicle is inhibited from being driven by the battery management device when the temperature of the battery group is lower than the first heating threshold and the residual electric quantity of the battery group is lower than a parking electric quantity threshold.

13. The method of claim 12, further comprising:
controlling the battery heater to heat the battery group in a parking heating mode when the residual electric quantity of the battery group is larger than the parking electric quantity threshold but lower than the running electric quantity threshold, in which the running electric quantity threshold is larger than the parking electric quantity threshold.

14. The method of claim 12, further comprising:
allowing the hybrid electric vehicle to enter into one of the electric vehicle mode and the hybrid electric vehicle mode by the battery management device when the residual electric quantity of the battery group is larger than the running electric quantity threshold;
judging whether a current throttle depth change rate of the hybrid electric vehicle reaches a preset throttle depth change rate threshold when the hybrid electric vehicle is in the electric vehicle mode by the battery management device; and
controlling the battery heater to stop heating the battery group when the hybrid electric vehicle is not in the hybrid electric vehicle mode and when the current throttle depth change rate of the hybrid electric vehicle reaches the preset throttle depth change rate threshold.

15. The method of claim 12, further comprising:
judging whether a heating button is pressed by the battery management device;
when the heating button is pressed, controlling the battery heater to heat the battery group; and
when the heating button is not pressed, indicating that the battery group is inhibited from one of being heated or being charged and the hybrid electric vehicle is inhibited from being driven.

16. The method of claim 15, further comprising:
when the heating button is pressed again, judging whether an operation of pressing the heating button again satisfies a preset condition, and when the operation of pressing the heating button again satisfies the preset condition, controlling at least one of the hybrid electric vehicle and the battery heater according to the temperature of the battery group and the residual electric quantity of the battery group.

17. The method of claim 12, further comprising:
when the temperature of the battery group is lower than a first temperature threshold, indicating that the battery group is inhibited from one of being heated and being charged and the hybrid electric vehicle is inhibited from being driven;
when the temperature of the battery group is higher than the first temperature threshold and the residual electric quantity of the battery group is lower than a first electric quantity threshold, indicating that the battery group is inhibited from one of being heated and being charged and the hybrid electric vehicle is inhibited from being driven; and
when the temperature of the battery group is higher than the first temperature threshold and the residual electric quantity of the battery group is larger than the first electric quantity threshold, allowing the hybrid electric vehicle to run under a limited power.

18. The method of claim 12, further comprising:
adjusting a heating power of the battery heater according to the temperature of the battery group by the battery management device.

19. The method of claim 12, further comprising:
calculating a current temperature of the battery group and a current residual electric quantity of the battery group by the battery management device;
calculating a maximum output power of the battery group according to the current temperature of the battery group and the current residual electric quantity of the battery group by the battery management device; and
controlling the hybrid electric vehicle to run under a limited power according to the maximum output power of the battery group.

20. The method of claim 12, further comprising: controlling the battery heater to stop heating the battery group when any of following conditions is satisfied:
the temperature of the battery group is higher than the first heating threshold;
a temperature of any single battery in the battery group is higher than a second heating threshold, wherein the second heating threshold is larger than the first heating threshold; and
a continuous heating time of the battery heater is larger than a heating time threshold.

* * * * *